(12) United States Patent
Subramanian et al.

(10) Patent No.: US 9,197,536 B2
(45) Date of Patent: Nov. 24, 2015

(54) USE OF ALTERNATE PATHS IN FORWARDING OF NETWORK PACKETS

(71) Applicant: DELL PRODUCTS L.P., Round Rock, TX (US)

(72) Inventors: Krishnamurthy Subramanian, Saratoga, CA (US); Shivakumar Sundaram, Tamil Nadu (IN)

(73) Assignee: Dell Products L.P., Rouund Rock, TX (US)

(*) Notice: Subject to any disclaimer, the term of this patent is extended or adjusted under 35 U.S.C. 154(b) by 38 days.

(21) Appl. No.: 14/088,132

(22) Filed: Nov. 22, 2013

(65) Prior Publication Data

US 2015/0146720 A1 May 28, 2015

(51) Int. Cl.
  *H04L 12/727* (2013.01)
  *H04L 12/721* (2013.01)
  *H04L 12/761* (2013.01)
  *H04L 12/707* (2013.01)

(52) U.S. Cl.
  CPC ............ *H04L 45/121* (2013.01); *H04L 45/123* (2013.01); *H04L 45/16* (2013.01); *H04L 45/22* (2013.01)

(58) Field of Classification Search
  CPC ........ H04L 45/121; H04L 45/16; H04L 45/22
  See application file for complete search history.

(56) References Cited

U.S. PATENT DOCUMENTS

| | | | |
|---|---|---|---|
| 6,671,819 B1 * | 12/2003 | Passman et al. | 714/4.1 |
| 8,787,400 B1 * | 7/2014 | Barth et al. | 370/419 |
| 2001/0037409 A1 * | 11/2001 | Ricciulli | 709/310 |
| 2006/0104199 A1 * | 5/2006 | Katukam et al. | 370/216 |
| 2009/0106529 A1 | 4/2009 | Abts et al. | |
| 2012/0063465 A1 * | 3/2012 | Keesara et al. | 370/401 |
| 2012/0144065 A1 | 6/2012 | Parker et al. | |
| 2012/0170582 A1 | 7/2012 | Abts et al. | |

OTHER PUBLICATIONS

Thaler, D., "Multipath Issues in Unicast and Multicast Next-Hop Section", Memo—The Internet Society Network Working Group Request for Comments: 2991, Nov. 2000, 9 pages.

Hopps, C., "Analysis of an Equal-Cost Multi-Path Algorithm", Memo—The Internet Society Network Working Group Request for Comments: 2992, Nov. 2000, 8 pages.

Atlas, A., "Basic Specification for IP Fast Reroute: Loop-Free Alternates", Memo—The Internet Society Network Working Group Request for Comments: 5286, Sep. 2008, 31 pages.

Shand et al., "IP Fast Reroute Framework", Memo—The Internet Society Network Working Group Request for Comments: 5714, Jan. 2010, pp. 15 pages.

John Kim et al., "Flattened Butterfly Topology for On-Chip Networks", Computer Architecture Letter, vol. 6, Issue: 2, Feb. 2007, 11 pages.

Juniper Networks, Inc.,"Understanding and deploying Loop-Free Alternate Feature", Implementation Guide, 2009, 20 pages.

(Continued)

*Primary Examiner* — Mohammad Anwar
(74) *Attorney, Agent, or Firm* — Haynes and Boone, LLP

(57) ABSTRACT

In non-minimal routing, a switch determines outgoing links for preferred paths (e.g. shortest paths). Then, for another node in a preferred path, the switch determines outgoing links for paths to that node in a modified network in which each link in a previously determined path to the node is cut off. Packets can be tunneled on non-preferred paths to that node. Other features and embodiments are also provided.

35 Claims, 4 Drawing Sheets

(56) References Cited

OTHER PUBLICATIONS

John Kim et al., "Flattened Butterfly: A Cost-Efficient Topology for High-Radix Networks", ISCA'07, Jun. 9-13, 2007, San Diego, California, USA; ACM SIGARCH Computer Architecture News, vol. 35, Issue: 2, Jun. 2007, pp. 126-137.

Cisco Systems, Inc., "How Does Unequal Cost Path Load Balancing (Variance) Work in IGRP and EIGRP?", Document ID: 13677, Last Updated Jun. 3, 2009, 4 pages.

Cisco Systems, Inc., "Enhanced Interior Gateway Routing Protocol", Document ID: 16406, Last Updated Sep. 9, 2005, 44 pages.

Pinkston et al., "Interconnection Networks", Appendix E, Jul. 14, 2006, 114 pages.

* cited by examiner

USE OF ALTERNATE PATHS IN FORWARDING OF NETWORK PACKETS

BACKGROUND OF THE INVENTION

The present invention relates to telecommunications networks, and more particularly to packet forwarding.

FIG. 1 illustrates a telecommunications network, e.g. the Internet or a network used by a company or government organization. Routers 110.A, 110.B, . . . forward packets 114 between end-point nodes 120 (including 120A, 120B, etc.) and/or networks 130 comprising such nodes. The packets are transmitted over network links 140. Each router 110 may or may not be an end-point node, and each network 130 may include other routers 110 and nodes 120.

A router 110 forwards each packet based on the packet's address D_Addr and possibly other information, e.g. the incoming link 140 (the link on which the packet arrived). To enable packet forwarding, routers 110 exchange information on network topology to determine paths to nodes 120 and networks 130. For example, if a router F (i.e. 110.F) receives a packet from a node 120B, and the packet's destination address D_Addr identifies the node 120C, then the packet can be forwarded through routers 110.0 and 110.D or, alternatively, through routers 110.A, 110.B, 110.D. The router 110.F makes the forwarding decision based on the costs of the two paths. The "cost" can be defined in many ways, and may take into account delays, bandwidths, and reliability of links 140 in each path. According to many routing algorithms, router F selects the shortest path, i.e. the path having the minimal cost. This is called minimal routing, and it is used in many routing protocols, e.g. RIP (Routing Information Protocol), OSPF (Open Shortest Path First), ISIS (Intermediate System to Intermediate System), and BGP (Border Gateway Protocol).

Minimal routing reduces delays and improves other parameters of interest (depending on how the cost is defined). In addition, minimal routing helps eliminate loops in packet forwarding. The loops are eliminated because on each hop of the shortest path, the packet moves closer to the destination (i.e. the cost to the destination decreases on each hop), and this means that the packet cannot return to a previous hop. In contrast, in non-minimal routing, loops are more difficult to avoid, but non-minimal routing increases the path diversity (the number of paths between given network nodes), and thus may increase the network utilization and bandwidth, relieve congestion, and improve reliability in case of failure.

An example of non-minimal routing is found in EIGRP (Extended Interior Gateway Routing Protocol). Suppose a router A (FIG. 2) receives a packet 114 with a destination address D_Addr corresponding to a network 130.N. Router A can reach network 130.N via router B or router C. Suppose that the cost of each path is the sum of the costs of the links. Exemplary costs are shown next to the links; for example, the link "AC" between routers A and C has the cost of 10, the link "AB" between A and B has the cost of 7, etc. (The links are assumed bidirectional in this example, with the same cost in each direction.) The costs of the paths from router A to network 130.N are as follows:

path A-B-D-N (from A to B, then to D, then to network 130.N) has the cost of 7+11+1=19;
path A-C-D-N has the cost of 10+10+1=21;
path A-C-B-D-N has the cost of 10+15+11+1=37;
path A-B-C-D-N has the cost of 7+15+10+1=33.
The shortest path is A-B-D-N.

Router A therefore configures itself to forward the packets addressed to network 130.N on link AB. If link AB fails, then path A-C-D-N becomes the shortest, and router A starts forwarding the packets on link AC.

EIGRP also provides non-minimal routing when there is no failure: router A can be configured to use both links AB and AC even when there is no failure. If so configured (by an administrator), router A will proportion the traffic based on the costs: most packets to network 130 will be forwarded on link AB, but some of the packets will be forwarded on the non-minimal path on link AC.

The danger is that if a packet is forwarded to router C (on link AC), and router C uses non-minimal forwarding, then router C may return the packet back to router A, and the packet may circulate between A and C indefinitely without reaching the destination. To prevent such looping, EIGRP allows a router to use a non-minimal path only if the next hop on the path is closer to the destination than the router itself. In FIG. 2, router C is closer to network 130.N (at the shortest distance of 10+1=11) than router A (shortest distance is 7+11+1=19), and therefore A can forward the packets to C for network 130.N. However, C cannot forward such packets to A because A is farther from destination 130.N than C. In fact, C cannot use any non-minimal path to the destination 130.N through router A or B because routers A and B are farther from network 130.N than C.

In FIG. 3, the cost of the CD link is increased to 20, and therefore router A cannot perform non-minimal forwarding because now router C is farther away from network 130.N than router A.

SUMMARY

This section summarizes some features of the invention. Other features may be described in the subsequent sections. The invention is defined by the appended claims, which are incorporated into this section by reference.

Some embodiments of the present invention increase the number of non-minimal paths. For example, in some embodiments, the router A of FIG. 3 can use non-minimal paths through router C. This is achieved by causing the router C to forward a packet differently depending on whether the packet is received on the shortest path or a non-minimal path.

For example, in some embodiments, the non-minimal paths are set up using detours around portions of the shortest paths. In the example above, the shortest path from A to 130.N is through B, and the detour can be A-C-B. After the detour, the non-minimal path continues from B in any suitable way. If the detour has no loops, then loops are unlikely. In some embodiments, the detours are arranged so that the entire non-minimal path has no loops.

In FIG. 3, loops can be avoided in non-minimal forwarding even if C is farther from destination 130.N than A (if the detour is A-C-B, then the entire non-minimal path is A-C-B-D-N).

A detour can be implemented in different ways. One way is a tunnel: the router A can tunnel the packet through C to B. The tunnel may specify B as the destination, or the tunnel can specify the whole detour path (the detour may pass through multiple routers). The detour may be to the final destination (e.g. network 130.N), but loops will be avoided through use of tunneling.

The invention is not limited to the features and advantages described above except as defined by the appended claims.

DESCRIPTION OF SOME EMBODIMENTS

The embodiments described in this section illustrate but do not limit the invention. The invention is defined by the appended claims.

Figure 3:
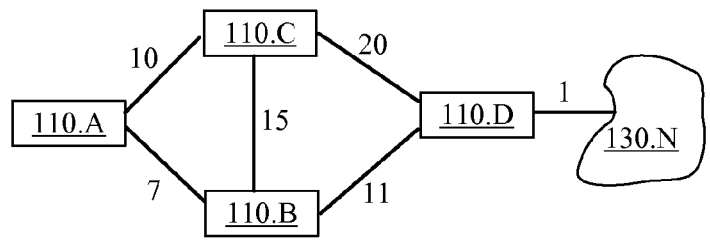
Figure 4:
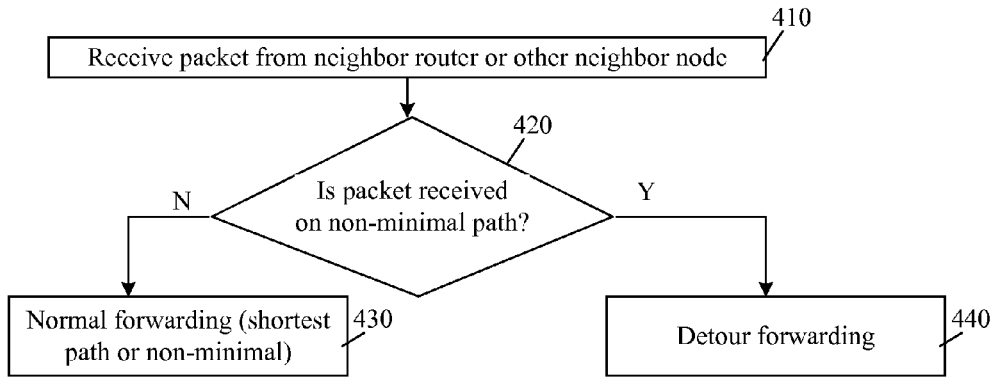
FIG. 4 is a flowchart of packet forwarding according to some embodiments of the present invention.

FIG. 4 illustrates packet forwarding by a router 110 according to some embodiments of the present invention. This is a conceptual illustration—some embodiments may omit some of the steps and/or perform additional steps. For the sake of illustration, the router can be router C in FIG. 3. At step 410, the router receives a packet from a neighbor, for example from router A of FIG. 3. The neighbor does not have to be a router but can be a non-router node, e.g. a node 120. The packet can also be generated by router C internally rather than received over a network.

A shown at 420, the packet forwarding depends on whether the packet was obtained through non-minimal forwarding. "Non-minimal forwarding" implies that the packet was received from a neighbor which is a router having non-minimal forwarding enabled. If there was no non-minimal forwarding, i.e. the packet was not received from a neighbor, or the neighbor is not a router or is a router that forwarded the packet using shortest-path forwarding, then, at step 430, the router C will perform normal forwarding operation. In particular, C may forward the packet on the shortest path to the packet's destination address (which may or may not be a tunnel address as described below), or C may perform non-minimal forwarding if C is enabled to do so.

If the packet was obtained through non-minimal forwarding, then (at 440) the router C will perform detour forwarding. For example, C may forward the packet to the detour end (e.g. to B or D); the detour end can be any router in the network on the shortest path from the neighbor (A) to the destination. If C itself is the detour end, then C may perform normal forwarding to the packet's destination (i.e. shortest-path forwarding or possibly non-minimal forwarding).

Figure 5:
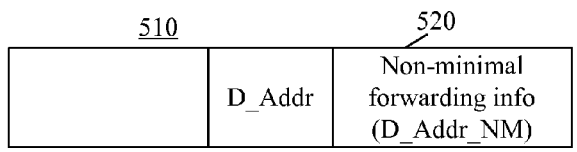
FIG. 5 illustrates a packet according to some embodiments of the present invention.

In some embodiments, when the neighbor router (such as A) decides to forward the packet on a non-minimal path, the neighbor router modifies the packet. FIG. 5 illustrates an exemplary modified packet 510. In this example, router A appends non-minimal forwarding data 520 to the packet, or modifies the packet to include data 520. For example, router A may encapsulate the packet to tunnel the packet to the detour end, and data 520 may be the tunneling header including a path identifier for the tunnel or including the tunnel's termination address (detour end address) D_Addr_NM. In other embodiments, the address D_Addr_NM is the address of the last hop before the tunnel end; the last hop will forward the packet to the tunnel end on a direct link. Many tunneling protocols are suitable, including MPLS (Multiprotocol Label Switching), 802.1BR (Bridge Port Extension of the IEEE 802), L2GRE (Layer 2 over Multipoint GRE, i.e. Generic Routing Encapsulation), NVGRE (Network Virtualization using GRE), VxLAN (Virtual Extensible LAN (Local Area Network)), IP GRE, IP in IP, Higig™ (Broadcom Corporation), and others.

In case of tunneling, router C may perform normal forwarding for all packets, non-minimally forwarded or otherwise obtained. If the packet is being tunneled, router C will either forward the packet along the tunnel or, if the tunnel terminates at C, then C will terminate the tunnel and perform normal forwarding on the original packet. Thus, the only operation performed is 430, but conceptually the flowchart of FIG. 4 is applicable because detour forwarding 440 is reduced to normal forwarding.

In other embodiments, packets are not necessarily modified for detours, but router C receives such packets on a different link or links 140 than other packets, and router C uses different forwarding databases (e.g. different routing databases) to forward the packets received on such links. This technique is similar to Virtual Routing and Forwarding techniques.

We will now describe some examples of how the neighbor router, such as A, can be configured to perform non-minimal forwarding. Router A may configure itself automatically, but in some embodiments automatic configuration is replaced or supplemented by an administrator's action.

Figure 6:
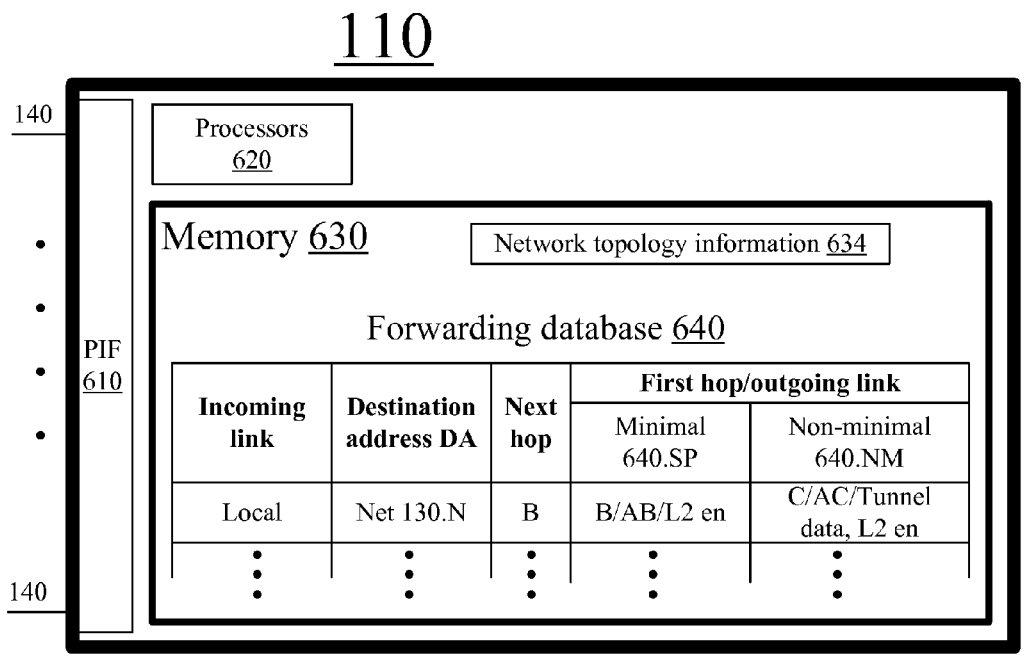
FIG. 6 is a block diagram of a router according to some embodiments of the present invention.

FIG. 6 shows an exemplary router architecture for use as a reference, but the invention is not limited to any particular architecture. In FIG. 6, router 110 has port interface circuits 610 connected to links 140. PIF circuits 610 may include memory buffers (not shown) for queuing the incoming and outgoing packets, and may include computer processors and/or other circuitry (not shown) for packet processing as known in the art. Router 110 also includes one or more computer processors 620 and memory 630 (these may or may not include the memory and processors in port interfaces 610). Memory 630 may include semiconductor memory, magnetic disks, or other types of computer storage. Processors 620 may execute software stored in memory 630 to perform various tasks. The tasks may include maintaining network topology information 634 about routers 110 and links 140, maintaining forwarding database 640, and others.

Figure 1:
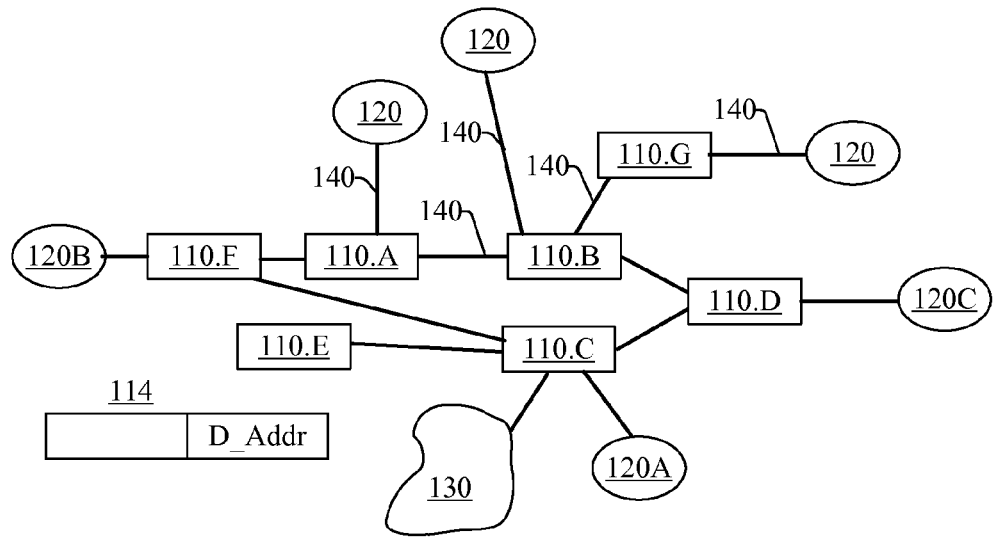
FIGS. 1, 2, 3 illustrate networks used in prior art and in some embodiments of the present invention.

Forwarding database 640 allows router 110 to determine the outgoing link or links on which a packet is to be forwarded. The outgoing link is determined based on the packet's destination address DA (such as D_Addr in FIG. 1 or D_Addr_NM in FIG. 5). In the example of FIG. 6, the outgoing links also depend on the incoming link, i.e. the link on which the packet was received. In some embodiments, the outgoing links may depend on whether or not the packet is being tunneled, and/or on other parameters. In some embodiments, database 640 may store only a portion (e.g. prefix) of the destination address DA, as common for IP routers. FIG. 6 illustrates an exemplary database entry that can be stored, for example, by router A of FIG. 2 or 3. This entry is for packets arriving on "local links", i.e. on ports not directly connected to any router in the network domain (e.g. an autonomous system) in which the routing protocol is executed (such ports can be connected to a node 120 or a network 130 or they may be connected to other circuitry within the router itself). If the "incoming link" is such a port, and the packet's destination address DA identifies network 130.N, then the next hop is B. The first hop (i.e. the hop to which the packet should be forwarded to reach the next hop) is B for the minimal path, and C for the detour. For the minimal path, the packet is forwarded on link AB (shortest path) as shown in column 640.SP. For the non-minimal path, the packet is forwarded to first hop C on link AC as shown in column 640.NM. In some embodiments, forwarding database 640 also specifies a proportion of traffic to be forwarded on links AB and AC. For example, the traffic can be proportioned based on the cost of each path (as in EIGRP). In another example, the router A treats all the links in files 640.SP and 640.NM as in ECMP (Equal-Cost Multi-Path); see RFC 2991, 2992, both published by the Network Working Group, IETF (Internet Engineering Task Force) in November 2000, incorporated herein by reference. In ECMP forwarding, for each packet, the particular link (AB or AC) can be selected based on a hash of certain fields in the packet header; the hash is over the fields identifying a packet flow (for example, the fields specifying the layer 3 source and destination addresses). This ensures that a given flow always uses the same outgoing link, which may be desirable. Further, if different routers use the same hash algorithm, then each flow will always take the same path through the entire network even though the flow may include many detours and many non-detour segments. Therefore, the flows can be load-balanced in a proportionate (weighted) manner through the entire network. For example, in FIGS. 2 and 3, the routers may treat minimal and non-minimal paths to a destination as equal-cost paths and may load-balance the traffic for that destination in a proportionate (weighted) manner across all the possible paths, e.g. A-C-D-N, A-B-D-N, A-C-B-D-N, A-B-C-D-N.

In some embodiments, the particular link (AB or AC) is selected based on the Service Level Agreement (SLA) between the network service provider and a customer, with preferred customers having more of their traffic forwarded over the shortest path than other customers.

A single entry in database 640 may contain multiple minimal links 640.SP and/or multiple non-minimal links 640.NM. For each non-minimal link 640.NM, database 640 may also store information on how to modify the packet for the non-minimal forwarding on each link. This information may include tunnel encapsulation information ("Tunnel data" in FIG. 6) which includes a path identifier or final destination for the tunnel to be defined by the packet's non-minimal forwarding portion 520 (FIG. 5).

Database 640 may include other information as known in the art. For example, in case of layer-3 forwarding, database 640 may specify L2 (layer-2) encapsulation information (shown as "L2 en" in FIG. 6), e.g. layer-2 addresses and possibly other layer-2 header information, for each outgoing link.

Figure 7:
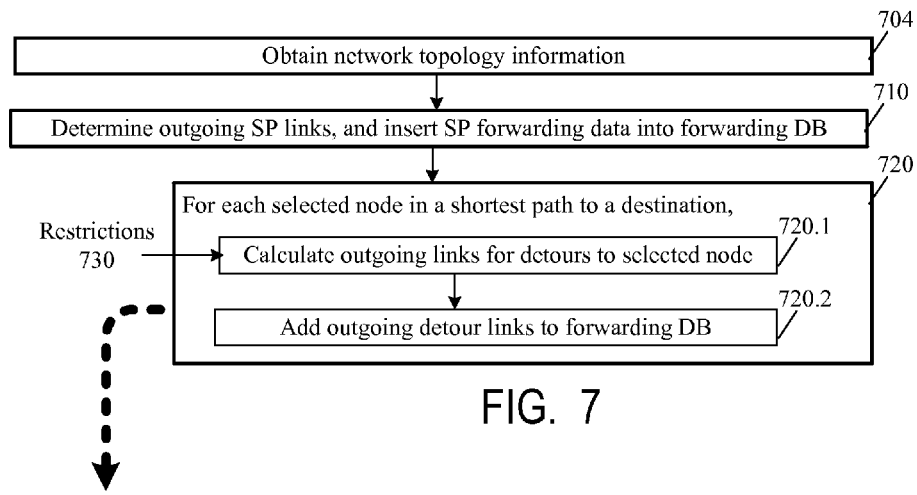
FIGS. 7, 7A are flowcharts of configuring a router to use non-minimal paths according to some embodiments of the present invention.

FIG. 7 illustrates an exemplary process for a router (e.g. A) to construct its forwarding database 640. At step 704, the router obtains network topology information 634. This information can be obtained from discovery messages received from other routers, and/or can be manually entered by network administrator, and/or obtained from other sources. Step 704 may be performed by conventional methods. In IP embodiments, the discovery may use distance-vector routing protocols such as RIP, or link state protocols such as OSPF, or other types of protocols. In a link-state protocol, the network topology information 634 specifies the network topology, i.e. routers 110 and links 140. In a distance-vector protocol, the network topology information 634 specifies costs of reaching various destinations through different links connected to the router A.

At step 710, the router uses the network topology information 634 to determine the next hops and also to determine outgoing links 640.SP for shortest-path forwarding. This can be done by conventional methods.

At step 720, non-minimal forwarding is determined for selected nodes in the shortest paths. Based on network topology information and possibly the shortest paths information found at step 710, the router (A) selects other network nodes or sets of nodes for use as end points of detours. In some embodiments, all the selected network nodes are routers 110, e.g. the neighbor routers, but this not necessary. For each selected node in a shortest path to a destination, the router (such as A) performs steps 720.1 and 720.2. At step 720.1, the router determines outgoing links (e.g. AC for selected node B) that can provide a detour (e.g. A-C-B) to the selected node. In some embodiments, the detours are subjected to restrictions 730. For example, in the network of FIG. 2, the detours for neighbor B may include A-C-B but not A-C-D-B. Restrictions 730 may be pre-defined, and may differ for different selected nodes. Exemplary restrictions are described below.

A detour link may or may not exist.

At step 720.2, the outgoing detour links, if any, are inserted as the non-minimal outgoing links 640.NM for the respective destinations, e.g. for destinations which have the selected node in the non-minimal path and which satisfy the restrictions 730. Also, the forwarding database is provided with all the information (e.g. tunneling information) for the non-minimal forwarding on each detour link.

Restrictions 730 may be designed to reduce or eliminate loops. For example, in some embodiments, restrictions 730 are similar to the Loop-Free-Alternate (LFA) conditions described in See RFC 5714 ("IP Fast Reroute Framework", January 2010) and RFC 5286 ("Basic Specification for IP Fast Reroute: Loop-Free Alternates", September 2008), both published by IETF and incorporated herein by reference. More particularly, in some embodiments, the restrictions 730 include the following restriction (R1), which states that for any detour link AC from a router A to a router C for a neighbor B, the shortest path from C to B must not go through A:

Restriction R1:

Outgoing non-minimal link from A to a router C must satisfy the following equation (1):

$$\text{Distance }(C,B) < \text{Distance }(C,A) + \text{Distance }(C,B) \qquad (1)$$

where "Distance" is the shortest (optimal) distance.

Alternatively, the restrictions 730 may include the following restriction R2, requiring that C be closer to B than is A:

Restriction R2:

Outgoing link from A to a router C must satisfy the following equation (2):

$$\text{Distance }(C,B) < \text{Distance }(A,B) \qquad (2)$$

Figure 2:
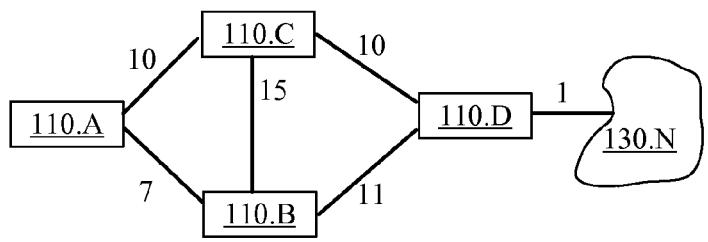
Figure 8:
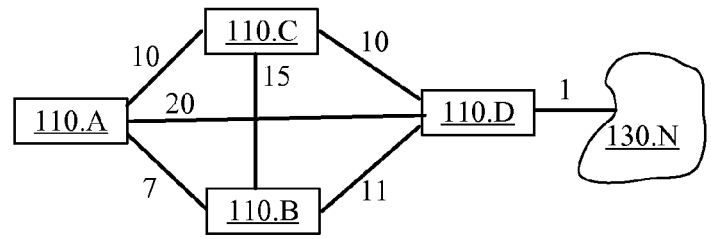
FIGS. 8-10 illustrate networks used in prior art and in some embodiments of the present invention.

The restrictions R1 and R2 do not ensure optimal forwarding as illustrated in the network of FIG. 8, which is the same as in FIG. 2 except for an additional AD link having the cost of 20. In this case, when router A uses the Restriction R1 to execute the step 720.1 for neighbor B, router A will calculate both AC and AD as outgoing detour links for the A-C-B and A-D-B detours respectively. However, if a packet's destination corresponds to network 130.N, and router A forwards the packet on link AD for the A-D-B detour, then D will forward the packet to B. But the packet has to return to D to reach the network 130.N, so even though there is no loop yet the forwarding is not optimal.

Similarly, if router A uses the Restriction R2, and the cost of link BD is reduced to 6 (so that the router D is closer to B than is the router A), router A will calculate AD as one of the outgoing detour links, and the packet will go through router D twice if the A-D-B detour is used.

In some embodiments, the routing can be improved by combining R1 or R2 with additional restrictions. For example, in some embodiments, additional restrictions eliminate links such as AD for non-minimal forwarding. For example, in some embodiments, one of the restrictions is that for any detour link AX from a router A to a router X, the router X must not be on the shortest path from A to the packet destination (in FIG. 8, AD will be excluded because D is on the shortest path A-B-D-N from A to destination 130.N).

In other embodiments, at step 720.1, if a link AX satisfies the restrictions 730 but the router X is in the minimal path from A to the destination, then AX is added as an alternate minimal link 640.SP (e.g. for ECMP forwarding). For example, in the case of FIG. 8, if router A forwards the packet on link AD as the minimal link, then router D will forward the packet directly to the packet's destination (130.N), so no loops will be present.

Additional restrictions may restrict the detour's cost. For example, in some embodiments, restrictions 730 require that the detour's cost must not exceed a certain percentage (e.g. 150%) of the shortest path to the same neighbor. Another possible restriction is on the cost of the non-minimal path using the detour. Another possible restriction is to select only those outgoing links that provide the shortest non-minimal path to the neighbor among all the non-minimal paths.

Another possible restriction is a pre-specified maximum number of the non-minimal paths, and step 720.1 selects the shortest or lowest-cost paths up to the maximum number.

Another possible restriction is the number of hops in the detour, or the maximum number of hops in the detour. (For example, the detour A-C-B has two hops.) Combinations of the above restrictions can be used.

Figure 7A:
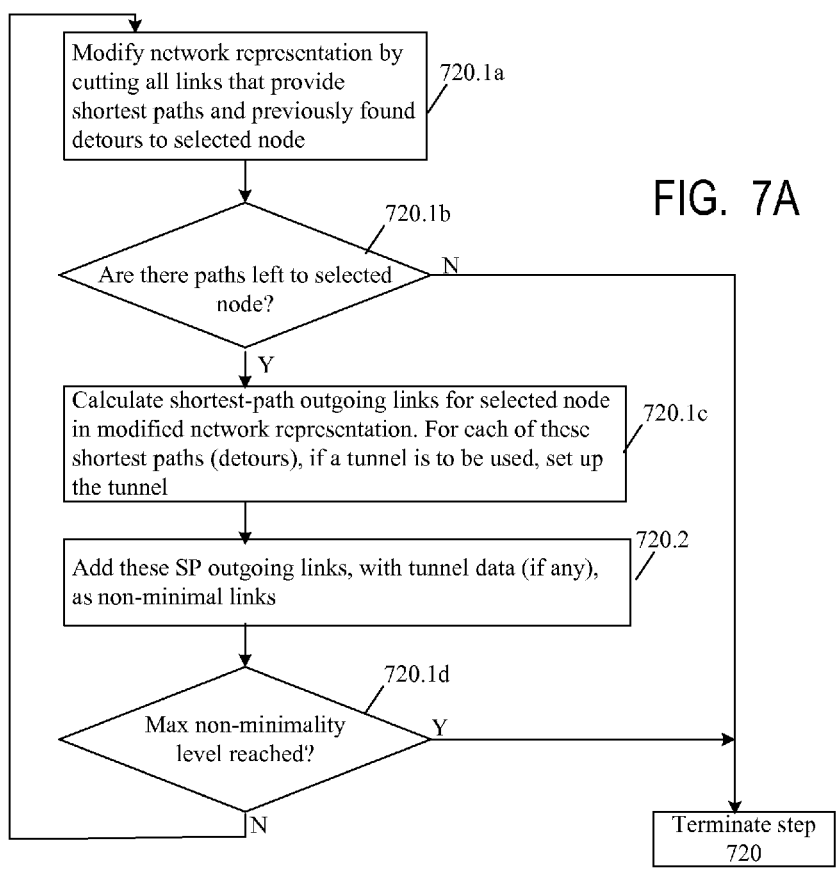

In some embodiments, step 720 is executed as shown in FIG. 7A. Step 720.1 is shown as sub-steps 720.1a through 720.1d. At step 720.1a, the router A obtains a modified network representation from network topology information 634. The modified network representation is obtained by cutting off all the links in the known shortest paths and known detour paths to the selected node. (The method of FIG. 7A can be performed repeatedly any number of times; at the first iteration, there will be no known detour paths, but the shortest paths will be known from step 710; for example, in FIG. 8, the router A will cut off the link AB for selected node B.) Router A cuts off not only the outgoing links in the shortest paths or known detours but all the links in the shortest paths and known detour paths. In FIG. 8, the shortest path from A to B is the direct link AB, but in some embodiments, the shortest path is not the direct link, or is one of multiple direct links in a path to the selected node.

At step 720.1b, router A determines whether the modified network representation has a path from A to the selected node. If there are no paths left, then step 720 terminates.

If there is at least one path left, then at step 720.1c, router A determines all the shortest-path outgoing links for the shortest paths to the selected node in the modified network representation. Each of these shortest paths can be a new detour to the selected node. These shortest paths can be determined by conventional methods (as in step 710). In the example of FIG. 8, the shortest path to selected node B is A-C-B, and the shortest-path outgoing link is AC. If any of these new detours will be implemented by a tunnel, then router A automatically sets up the tunnel (e.g. assigns a unique tunnel identifier and performs other actions as needed depending on the tunneling protocol) and determines the tunnel data for entries 640.NM. Router A also determines the L2 encapsulation data ("L2 en" in FIG. 6).

At step 720.2, the outgoing links found at step 720.1c are added as non-minimal links 640.NM to the forwarding database 640 for each entry which has a shortest path passing through the selected node. The tunneling data and L2 encapsulation data are also added.

Optionally, the process of FIG. 7A can be repeated any desired number of times. The number of times may be specified by restrictions 730. At step 720.1d, the maximum number of times is shown as "maximum non-minimality level". If the maximum non-minimality level has not been reached, i.e. the steps 720.1a-720.2 have been performed less than the specified number of times, then the next iteration begins at step 720.1a. For example, in the second iteration for the network of FIG. 8, at step 720.1a, the router A will cut off the links AB, AC and CB. At step 720.1b, the router A determines A-D-B as the shortest path. At step 720.2, router A will add the link AD as the non-minimal link 640.NM for each entry having the link AB as a minimal link (640.SP). However, at step 720.1c or 720.2, the router A may apply the restrictions 730 to exclude the link AD as described above.

When the maximum non-minimality level has been reached at step 720.1d, step 720 terminates.

The invention is not limited to any particular sequence of steps. For example, steps 720.1c, 720.2 can be performed for each shortest path before they are performed for the next shortest path (i.e. once a shortest path is determined, the database 640 can be updated before determining the next shortest path). Thus, different steps can be merged or intermixed or performed in an order other than shown.

The invention is not limited to the embodiments described. For example, in some embodiments, there is no maximum non-minimality level, and the process of FIG. 7A terminates only when there are no paths left (step 720.1b).

In some embodiments, restrictions 730 vary with each iteration.

Figure 9:
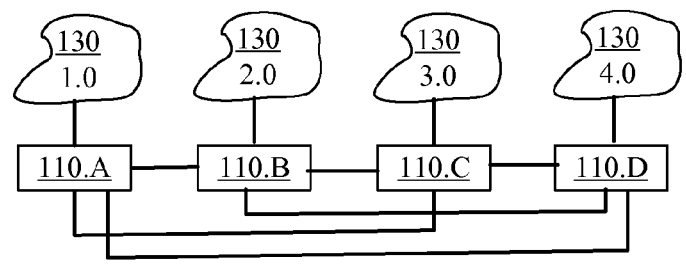

While the invention is not limited to any particular network architecture, some embodiments are particularly suitable for networks having high connectivity and low cost per link (e.g. low delay per link). In such networks, there are many non-minimal paths, and hence the network throughput and reliability are greatly increased. At the same time, due to low cost per link, the cost increase can be low when non-minimal paths are used. Such networks include Systems/Storage Area Networks used at data centers and other environments. Exemplary network architectures include CLOS, Dragon Fly, Flattened Butterfly, and others. FIG. 9 illustrates an exemplary one-dimensional flattened-butterfly network with four fully interconnected routers A, B, C, D (each router is directly connected to every other router). Flattened butterfly topology is described in John Kim et al., "Flattened Butterfly: A Cost Efficient Topology for High Radix Networks", ISCA '07, Jun. 9-13, 2007, San Diego, Calif., USA, incorporated herein by reference. Each router is directly connected to a respective network 130. Networks 130 have respective routing prefixes 1.0, 2.0, 3.0, 4.0.

As noted above, the routers are fully interconnected. Suppose that all the links are bidirectional and have the same cost. Therefore, the shortest path from any router to a network 130 connected to a different router is along the direct link between the two routers. For example, the shortest path from router B to address prefix 1.0 is along the link AB. If router A receives a packet from router B with a destination other than 1.0, the packet must be on a non-minimal route. Suppose that each detour is limited to 2 hops. Then router A must forward the packet on the shortest path. For example, if the destination prefix is 4.0, the packet must be forwarded on link AD. Hence, no tunneling or other packet modification is needed to distinguish between the shortest-path packets and non-minimal path packets. The forwarding database 640 for router A can be as follows (the first column, "Entry no." is just for convenience of reference):

TABLE 1

(no tunneling)

| Entry no. | Incoming link | Destination address | Outgoing links Minimal | Non-minimal |
|---|---|---|---|---|
| 1 | Local network 130 | 1.0 | Link connected to local net 130 | |
| 2 | Local network 130 | 2.0 | AB | AC, AD |
| 3 | Local network 130 | 3.0 | AC | AB, AD |
| 4 | Local network 130 | 4.0 | AD | AB, AC |
| 5 | AB, AC or AD | 1.0 | Link connected to local net 130 | |
| 6 | AB, AC or AD | 2.0 | AB | |
| 7 | AB, AC or AD | 3.0 | AC | |
| 8 | AB, AC or AD | 4.0 | AD | |

Entries 5 through 8 are for the non-minimal routes, and these packets must be forwarded on the direct links (i.e. shortest paths) as explained above.

If tunneling is used, and the tunnel terminates at the detour end (e.g. as in MPLS, 802.1BR, Higig) then the entries 5 through 8 will correspond to packets received in a tunnel. The destination addresses are D_Addr_NM, i.e. the destination addresses in the forwarding database will be respectively the addresses of A, B, C, D instead of 1.0, 2.0, 3.0, 4.0.

The forwarding database 640 can be constructed by the process of FIGS. 7 and 7A if the selected nodes at step 720 are all the neighbors (B, C, D) of router A, and the steps of FIG. 7A are performed only once.

Figure 10:
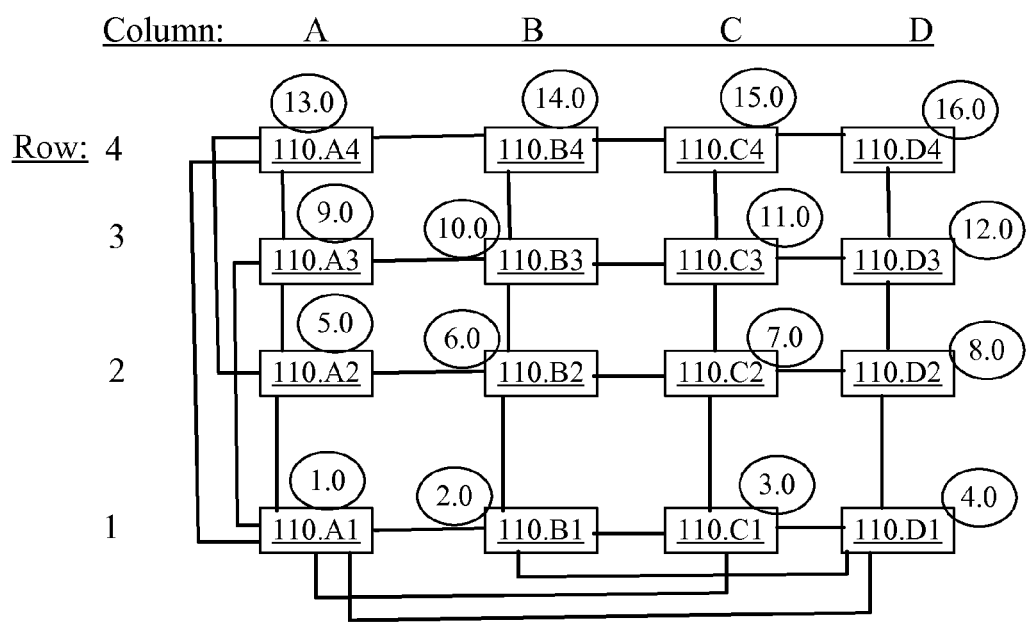

FIG. 10 illustrates a two-dimensional flattened butterfly network, with four routers in each row and column For convenience of reference, the rows are labeled 1, 2, 3, 4; the columns are labeled A, B, C, D. If a router is column X and row i, it is labeled 110.Xi; for example, the router in column B and row 2 is labeled 110.B2.

All the routers of each row are fully interconnected (as in FIG. 9), and all the routers in each column are fully interconnected. There are no other links however. In other words, the routers Xi (i.e. 110.Xi) and Yj are neighbors if, and only if, X=Y or i=j. Some of the links are not shown.

Each router can be connected to a network 130, and the network's prefix is circled next to each router (router A1 is connected to a network 130 with address prefix 1.0; router A2 is connected to a network 130 with network prefix 2.0, and so on).

Suppose all links have the same cost. If each detour must have 2 hops, then no packet modification is needed. This can be seen from the following statements:

(S1) Shortest paths: If the routers Xi and Yj are in the same row or column, the shortest path from Xi to Yj is the direct link in that row or column, so the minimal link 640.SP is Xi-Yj. If the two routers are in different rows and different columns, then there are two shortest paths: along the row and then along the column (Xi-Yi-Yj) or along the column and then along the row (Xi-Xj-Yj). Therefore, the links 640.SP are Xi-Yi and Xi-Xj.

(S2) Detours: Suppose we need a detour from a router Xi to its neighbor Yj. The neighbors must be in the same row or column If Xi and Yj are in the same row, then each detour is a 2-hop path in the same row, and the detour links 640.NM can be found as in the case of FIG. 9. If Xi and Yj are in the same column, each detour is a 2-hop path in the same column. Again, the detour links 640.NM can be found as for FIG. 9.

(S3) If router Xi receives a packet addressed to the router's own network 130, then the outgoing link(s) 640.SP are the links connected to the network 130, and there is no non-minimal link 640.NM (this is similar to the case of FIG. 9).

(S4) For router Xi, if the incoming link is connected to the router's own network 130, then the shortest paths are determined from (S1) above. For each shortest path, for the next hop on the shortest path, possible detour paths and their outgoing links are determined from (S2).

(S5) If router Xi receives a packet addressed to a network 130 connected to another router Yj, and the incoming link is from another router Z, then:

(S5.1) If Xi and Yj are in the same row (i=j) or in the same column (X=Y), then Xi is in the shortest path. The outgoing minimal link 640.SP is Xi-Yj, and the non-minimal links 640.NM are determined as in (S2).

(S5.2) If Xi and Yj are in different rows and columns, then Xi is the first hop in the detour, and the packet must be forwarded on the direct link to the detour end. Therefore, non-minimal links 640.NM are absent. The minimal links 640.SP are as follows:

(S5.2a) If the incoming link is in the same row as Xi, then the outgoing minimal link is Xi-Yi (the packet stays in the same row, but is forwarded to the same column as the destination Yj).

(S5.2b) If the incoming link is in the same column as Xi, then the outgoing minimal link is Xi-Xj.

Tunneling or other packet modification can be omitted, but tunneling can reduce the database 640 size because tunneling information 520 can be used to make forwarding decisions to be independent from the incoming link and based on whether or not the packet to be forwarded arrives in a detour tunnel. More particularly, the forwarding links can be established for router Xi using the following statements:

(T1) If the packet arrives in a tunnel, then:

(T1a) If Xi is not the tunnel end (i.e. the tunnel end address D_Addr_NM identifies another router), then the forwarding decision must be based on D_Addr_NM. In this case, Xi is in the middle of a detour, and Xi must forward the packet on the direct link to D_Addr_NM. This direct link is the minimal link 640.SP; there are no non-minimal links 640.NM.

(T1b) If Xi is the tunnel end, then Xi terminates the tunnel (strips the data 520), and makes the forwarding decision based on the packet's address D_Addr. In this case, Xi is either in the middle or at the end of the shortest path, and the outgoing links are as in (S3) or (S5.1).

(T2) If the packet does not arrive in a tunnel, then:

(T2.1) If the packet destination is the router's own network 130, then the packet is forwarded directly to network 130 as in (S3).

(T2.2) If the packet destination is a network 130 connected to another router Yj, then the shortest path outgoing links 640.SP are determined from (S1), and the detour links 640.NM are determined from (S2).

Thus, the incoming link is not needed for the forwarding decisions. However, the forwarding decisions depend on whether or not the packet arrives in a tunnel, so the forwarding database 640 may need separate entries for tunneled and non-tunneled incoming packets. However, the overall size of database 640 is reduced if tunneling is used. The size reduction is particularly significant for a large number of rows and columns and for larger dimension. In a multidimensional flattened-butterfly network with d dimensions, each router 110 can be assigned a point in a d-dimensional space with coordinates $(i_1, \ldots i_d)$ in such a way that any two routers Xi, Yj would be directly connected (by a link 140) if, and only if, their points differ in only one coordinate and the difference is 1 modulo n where n is the number of routers in each dimension (i.e. the points are such that each of $i_1, \ldots i_d$ varies from 1 to n, and each point corresponds to a single router). In this case, the table size for detours without tunneling is [number of routes*(d+1)], and the table size for detours using tunneling is [number of routes+(d*(number of routers in each dimension)*(number of non-minimal path to reach each router in a dimension))]. In many embodiments, the number of routes/forwarding destinations in a router will be much larger than the number of routers in the network.

Table 2 below shows an exemplary forwarding table for router A1 in case of tunneling. The "Incoming link" column is unnecessary as explained above. In table 2, the links are indicated by specifying the start and end (e.g. A1-B1), or just by specifying the end (e.g. -B1); all the links start at A1.

TABLE 2

(tunneling)

| Entry no. | Incoming link | Destination address | Outgoing links Minimal | Non-minimal |
|---|---|---|---|---|
| 1 | Local network 130 or router in the same column | 1.0 | Link connected to local net 130 | |
| 2 | Local network 130 or router in same column (column 1) | 2.0 | A1-B1 | A1-C1, -D1 |
| | | 3.0 | A1-C1 | A1-B1, -D1 |
| | | 4.0 | A1-D1 | A1-B1, -C1 |
| 3 | Local network 130 or router in same row (row A) | 5.0 | A1-A2 | -A3, -A4 |
| | | 9.0 | A1-A3 | -A2, -A4 |
| | | 13.0 | A1-A4 | -A2, -A3 |
| 3 | Any | 6.0 | -A2 -B1 | -A3, -A4 -C1, -D1 |
| | | 10.0 | -A3 -B1 | -A2, -A4 -C1, -D1 |
| | | 14.0 | -A4 -B1 | -A2, -A3 -C1, -D1 |
| 4 | Any | 7.0, 11.0, 15.0, 8.0, 12.0, 16.0 | Similar to entry 3 | Similar to entry 3 |
| 5 | Router in same row (row 1) | A1 (tunnel address) | Local network 130 | Local network 130 |
| 6 | Router in same row (1) | B1 (tunnel address) | -B1 | |
| 7 | Router in same row (1) | C1 (tunnel address) | -C1 | |
| 8 | Router in same row (1) | D1 (tunnel address) | -D1 | |
| 9 | Router in same column (A) | A2 (tunnel address) | -A2 | |
| 10 | Router in same column (A) | A3 (tunnel address) | -A3 | |
| 11 | Router in same column (A) | A4 (tunnel address) | -A4 | |

The invention comprises many variations and is not limited to embodiments described above. For example, a link 140 can be wired or wireless link. A link is considered point-to-point, but different links can share the same physical medium; the links may be differentiated by addresses (e.g. layer-2 addresses) in the packets. Each link 140 may be a network which looks like a direct link to the routing protocol in use; for example, in IP routing, a link 140 may be a LAN. Also, a link can be a logical link, e.g. such as used between non-neighbor BGP peers.

A link 140 may be unidirectional. Also, if a link is bidirectional, it may have different costs for different directions. The invention is not limited to IP networks.

Some embodiments provide a method for a first switch to configure itself to forward packets to destinations specified by the packets. The term "switch" includes a router that forwards packets based on certain addresses (e.g. layer-3 addresses), and includes other switches which, for example, forward packets based on both layer 3 and layer 2 addresses, and/or based on other information. The features described above can be implemented on any switch. The method comprises:

(1) receiving, over the network, forwarding data (e.g. network topology information 634) from one or more other switches, the forwarding data comprising information on one or more paths to one or more destinations, each destination being a network node or a group of network nodes (for example, the destination may be a multicast destination, or may be a unicast destination identifying a network).

(2) Based on the forwarding data, the method determines one or more outgoing links for one or more preferred paths (e.g. shortest paths) to at least a first destination which is one of the destinations, the one or more preferred paths comprising a first preferred path which passes through second switch (e.g. router B). For example, determining such links may be performed at step 710 of FIG. 7.

The method further comprises: (3) determining one or more outgoing links for one or more alternate paths to the second switch (e.g. at step 720.1); and (4) the first switch configuring itself to alternately forward packets on the first preferred path or the one or more alternate paths if the packets' destinations specified by the packets comprise the first destination (e.g. at step 720.2). As used herein, "alternately" does not necessarily mean that that the first preferred path and the alternate path alternate for each successive packet (i.e. that every second packet is forwarded on the first preferred path and all the other packets are forwarded on the alternate path). The first preferred path or the one or more alternate paths can be chosen according to any desired algorithm when all these paths are available. For example, there could be two successive packets forwarded on the first preferred path, and the third packet forwarded on the alternate paths, based on the desired load balancing and/or Service Level Agreement(s) and/or some fields in the packets or other information.

Some embodiments provide a method for a first switch to configure itself to forward packets to destinations specified by the packets, the method comprising the first switch performing operations of:

(1) receiving, over the network, forwarding data from one or more other switches, the forwarding data comprising information on one or more paths to one or more destinations, each destination being a network node or a group of network nodes;

(2) based on the forwarding data, determining one or more outgoing links for one or more preferred paths to at least a first destination which is one of the destinations, the one or more preferred paths comprising a first preferred path which passes through a first entity or terminates at the first entity;

(3) determining one or more outgoing links for one or more alternate paths to the first entity; and (4) the first switch configuring itself to alternately forward packets on the first preferred path or the one or more alternate paths if the packets' destinations specified by the packets comprise the first destination, wherein the one or more alternate paths comprise a first alternate path which is associated with a packet modification to be performed for the packets forwarded on the first alternate path. In some embodiments, the packet modification is performed to tunnel the packet to the first entity.

In some embodiments, determining one or more outgoing links for an alternate path comprises determining one or more outgoing links for one or more modified preferred paths to the second switch, wherein each modified preferred path is determined supposing that each link is cut off if it lies in the non-modified preferred path between the first switch and the first entity (e.g. as in FIG. 7A).

Some embodiments provide a first switch configured to perform any of the methods described above. Some embodiments include non-transitory computer readable medium (e.g. a disk, or semiconductor memory, etc.) comprising computer instructions operable to cause a first switch to perform any of the methods described above. As used herein, the term "medium" comprises a set of multiple disks or memory chips or other types of media.

The invention is not limited to the embodiments described above. Other embodiments and variations are within the scope of the invention, as defined by the appended claims.

The invention claimed is:

1. A method for a first switch to configure itself to forward packets to destinations specified by the packets, the method comprising the first switch performing operations of:
  (1) receiving, over a network, forwarding data from one or more other switches, the forwarding data comprising information on one or more paths to one or more destinations, each destination being a network node or a group of network nodes;
  (2) based on the forwarding data, determining one or more outgoing links for one or more minimal paths to at least a first destination which is one of the destinations, the one or more minimal paths comprising a first minimal path which passes through a second switch;
  (3) determining one or more outgoing links for one or more non-minimal paths to the second switch by a determining operation which requires each outgoing link for the one or more non-minimal paths to satisfy a restriction that, if such a link connects the first switch to a third switch, then any minimal path from the third switch to the second switch does not pass through the first switch, wherein the determining operation allows the third switch to be farther from the first destination than the first switch; and
  (4) the first switch configuring itself to alternately forward packets on the first minimal path or the one or more non-minimal paths if the packets' destinations specified by the packets comprise the first destination when the first minimal path and the one or more non-minimal paths are available for packet forwarding;

after operation (4), the first switch performing operations of:

receiving one or more packets each of which specifies one or more destinations comprising the first destination: and for at least one such packet, selecting an outgoing link for forwarding the packet when the first minimal path and the one or more non-minimal paths are available for forwarding the packet, wherein the outgoing link is selected either (i) from the one or more outgoing links determined for the first minimal path, or (ii) from the one or more non-minimal paths, wherein a choice between (i) and (ii) depends at least in part on an incoming link on which the packet was received by the first switch.

2. The method of claim 1 wherein determining one or more outgoing links for one or more non-minimal paths comprises determining one or more outgoing links for one or more modified minimal paths to the second switch, wherein each modified minimal path is determined supposing that each link is cut off if it lies in at least one non-modified minimal path between the first switch and the second switch, wherein a non-modified minimal path is any minimal path in (2) that passes through the second switch;

wherein the one or more outgoing links for the one or more non-minimal paths comprise the one or more outgoing links for the one or more modified wed minimal paths.

3. The method of claim 2 wherein determining one or more outgoing links for one or more modified minimal paths is performed two or more times, each time (each iteration) supposing that each link is cut off if it lies (a) in a non-modified minimal path between the first switch and the second switch or (b) in a modified minimal path determined in any preceding iteration.

4. A first switch configured to perform the method of claim 3.

5. A non-transitory computer-readable medium comprising computer instructions operable to cause a first switch to perform the method of claim 3.

6. A first switch configured to perform the method of claim 2.

7. A non-transitory computer-readable medium comprising computer instructions operable to cause a first switch to perform the method of claim 2.

8. The method of claim 1 wherein operation (4) comprises the first switch setting up a tunnel for at least one non-minimal path, and configuring itself to use the tunnel for packet forwarding on the at least one non-minimal path.

9. A first switch configured to perform the method of claim 8.

10. A non-transitory computer-readable medium comprising computer instructions operable to cause a first switch to perform the method of claim 8.

11. The method of claim 1 further comprising the second switch performing operations of:
  determining minimal and non-minimal paths from the second switch to a first network node which is the first destination or a node in a path from the second switch to the first destination; and
  configuring itself to alternately forward packets on the minimal and non-minimal paths from the second switch to the first network node if the packets' destinations specified by the packets comprise the first destination and the packets are received on any one of the minimal and non-minimal paths from the first switch to the second switch.

12. The method of claim 1 wherein the second switch configuring itself comprises the second switch setting up a tunnel for at least one non-minimal path from the second switch to the first network node.

13. The method of claim 1 wherein at least one outgoing link for the one or more non-minimal paths satisfies a restriction that, if a link connects the first switch to a third switch, then a minimal path from the third switch to the second switch does not pass through the first switch.

14. A first switch configured to perform the method of claim 13.

15. A non-transitory computer-readable medium comprising computer instructions operable to cause a first switch to perform the method of claim 13.

16. A first switch configured to perform the method of claim 1.

17. A non-transitory computer-readable medium comprising computer instructions operable to cause a first switch to perform the method of claim 1.

18. The method of claim 1 wherein a choice between (i) and (ii) depends at least in part on a predefined plurality of fields in a header of the packet.

19. A first switch configured to perform the method of claim 18.

20. A non-transitory computer-readable medium comprising computer instructions operable to cause a first switch to perform the method of claim 18.

21. The method of claim 1 wherein a choice between (i) and (ii) depends at least in part on whether the packet was received by the first switch on a minimal path from another network node or a non-minimal path from the other network node.

22. A first switch configured to perform the method of claim 21.

23. A non-transitory computer-readable medium comprising computer instructions operable to cause a first switch to perform the method of claim 21.

24. The method of claim 1 wherein a choice between (i) and (ii) depends at least in part on whether or not the packet was received by the first switch via a tunnel constructed according to a predefined protocol.

25. A first switch configured to perform the method of claim 24.

26. A non-transitory computer-readable medium comprising computer instructions operable to cause a first switch to perform the method of claim 24.

27. The method of claim 1 wherein a choice between (i) and (ii) depends at least in part on a setting associated with a customer associated with the packet.

28. A first switch configured to perform the method of claim 27.

29. A non-transitory computer-readable medium comprising computer instructions operable to cause a first switch to perform the method of claim 27.

30. The method of claim 1 wherein a choice between (i) and (ii) depends on load balancing of traffic across the outgoing links for the first minimal path and the one or more non-minimal paths in accordance with predefined weights.

31. A first switch configured to perform the method of claim 30.

32. A non-transitory computer-readable medium comprising computer instructions operable to cause a first switch to perform the method of claim 30.

33. The method of claim 1 wherein the second switch is not a neighbor router of the first switch.

34. A first switch configured to perform the method of claim 33.

35. A non-transitory computer-readable medium comprising computer instructions operable to cause a first switch to perform the method of claim 33.

\* \* \* \* \*